(No Model.)
J. H. CUNNINGHAM.
SHOE CALK SHARPENER.
No. 296,392. Patented Apr. 8, 1884.
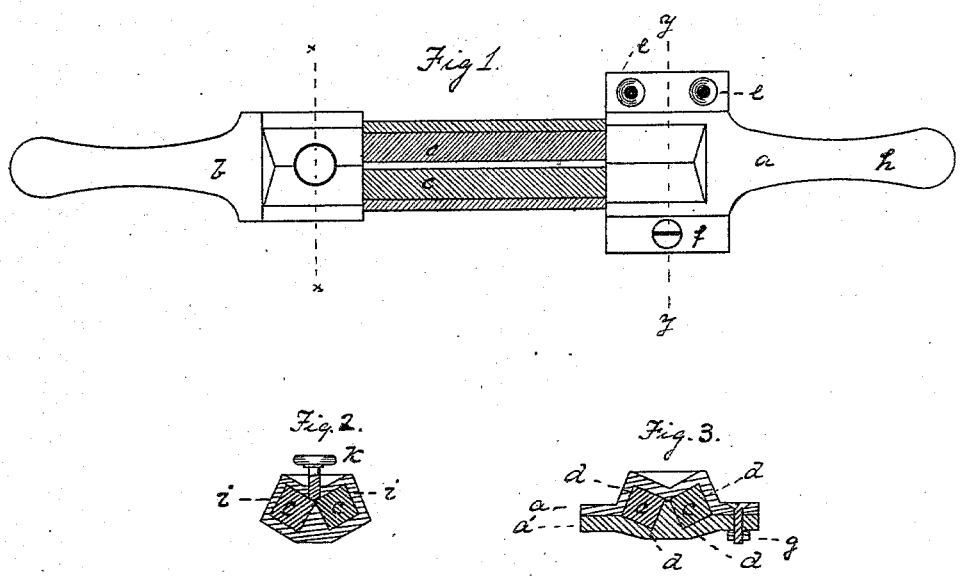
Witnesses
Jno. K. Smith
W. B. Corwin
Inventor
John H. Cunningham
by his attorneys
Bakewell & Kerr

UNITED STATES PATENT OFFICE.

JOHN H. CUNNINGHAM, OF ETNA, ASSIGNOR TO HIMSELF, AND WILLIAM M. FLAHAVEN, OF ALLEGHENY, PENNSYLVANIA.

SHOE-CALK SHARPENER.

SPECIFICATION forming part of Letters Patent No. 296,392, dated April 8, 1884.

Application filed January 11, 1884. (No model.)

*To all whom it may concern:*

Be it known that I, JOHN H. CUNNINGHAM, of Etna borough, in the county of Allegheny and State of Pennsylvania, have invented a new and useful Improvement in Shoe-Calk Sharpeners; and I do hereby declare the following to be a full, clear, and exact description thereof, reference being had to the accompanying drawings, forming part of this specification, in which—

Figure 1 is a plan view. Fig. 2 is a cross-section through the line $x\ x$, Fig. 1. Fig. 3 is a cross-section on the line $y\ y$, Fig. 1.

Like letters of reference indicate like parts wherever they occur.

The object of my invention is to provide a simple and durable tool for sharpening horseshoe-calks and producing a sharp angular edge on tools and other articles; and it consists in a pair of tools—such as files, rasps, or other like device—held at each end by clamps, one or both of said clamps being composed of two rigid leaves having V-shaped grooves for the reception of the ends of the files, and provided with an extension or handle, so that the tools may be conveniently held by the workman, while the files are retained in their proper relative position to each other.

I will now describe my invention, so that others skilled in the art may manufacture and use the same.

In the drawings, $a\ b$ represent the two clamps, which secure the files $c\ c$ at the ends thereof in their proper position. The clamp $a$ is formed of two pieces or leaves, $a\ a'$, in which are formed the V-shaped grooves $d\ d$, which, when the leaves are placed together face to face, form diamond-shaped cavities for the reception of the files. In the leaves on each side of these cavities are bolt-holes $e\ e\ e$, through which screws $f$ pass into a threaded nut, $g$, by means of which the leaves of the clamp are held firmly together. On the end of the upper leaf is a handle, $h$. The other clamp, $b$, is formed in a single piece, having the diamond-shaped cavities $i$, into which the set-screw $k$ passes through a threaded hole in the clamp.

The files $c\ c$, which form the cutting portion of the tool, may be of the usual form, having angular ends adapted to fit in the cavities $d\ d$ and $i\ i$, the bodies of the files lying parallel to each other, so as to form a V-shaped cutting-surface, there being a slight space between the edges of the files.

The clamps $a\ b$ are preferably formed of cast metal, which is cast in molds of suitable shape.

By means of the two leaves $a\ a'$ and the securing screws and nuts, the files $c\ c$ are held tightly together and securely in their proper position relatively to each other, and yet in such a manner that the files may be easily and rapidly removed and others inserted in their place.

The purpose of the clamp $b$ is to serve as a rest for the hand of the workman, it covering the sharp and rough edges of the files, and also to aid in securing the files in position.

I am aware that files side by side and secured by a jointed handle have been used heretofore, and also that tools have heretofore been adjustably secured in clamps or handles. The advantages of my invention, however, are that the tool produced is simple, light, and also that the tool as formed by me is much more easily handled than devices heretofore employed for the same purpose, and that the work of sharpening calks and other articles is much more perfectly and easily accomplished, owing to the rigidity of the files in position when secured by the clamps.

Having thus described my invention, what I claim, and desire to secure by Letters Patent, is—

1. In a tool for sharpening calks and other articles, the combination, with two files arranged parallel, of a clamp-handle composed of two plates or leaves, each provided with two parallel V-shaped grooves for the reception of the adjacent ends of the files, and devices for securing the leaves or plates together, substantially as and for the purposes specified.

2. In a tool for sharpening calks and other articles, the combination, with two files arranged parallel, of a handle provided with clamping-plates for securing the adjacent ends of the files at one extremity of the tool, and a detachable hand-rest provided with devices for clamping the adjacent ends of the file at the opposite extremity of the tool, substantially as and for the purposes specified.

3. In a tool for sharpening calks and like articles, the combination, with two files arranged parallel, of a detachable clamp for securing the adjacent ends of the two files, said clamp provided with a handle which extends in the axis or line of the files, substantially as and for the purposes specified.

In testimony whereof I have hereunto set my hand this 5th day of January, A. D. 1884.

JOHN H. CUNNINGHAM.

Witnesses:
 W. B. CORWIN,
 JAMES K. BAKEWELL.